United States Patent Office 3,014,974
Patented Dec. 26, 1961

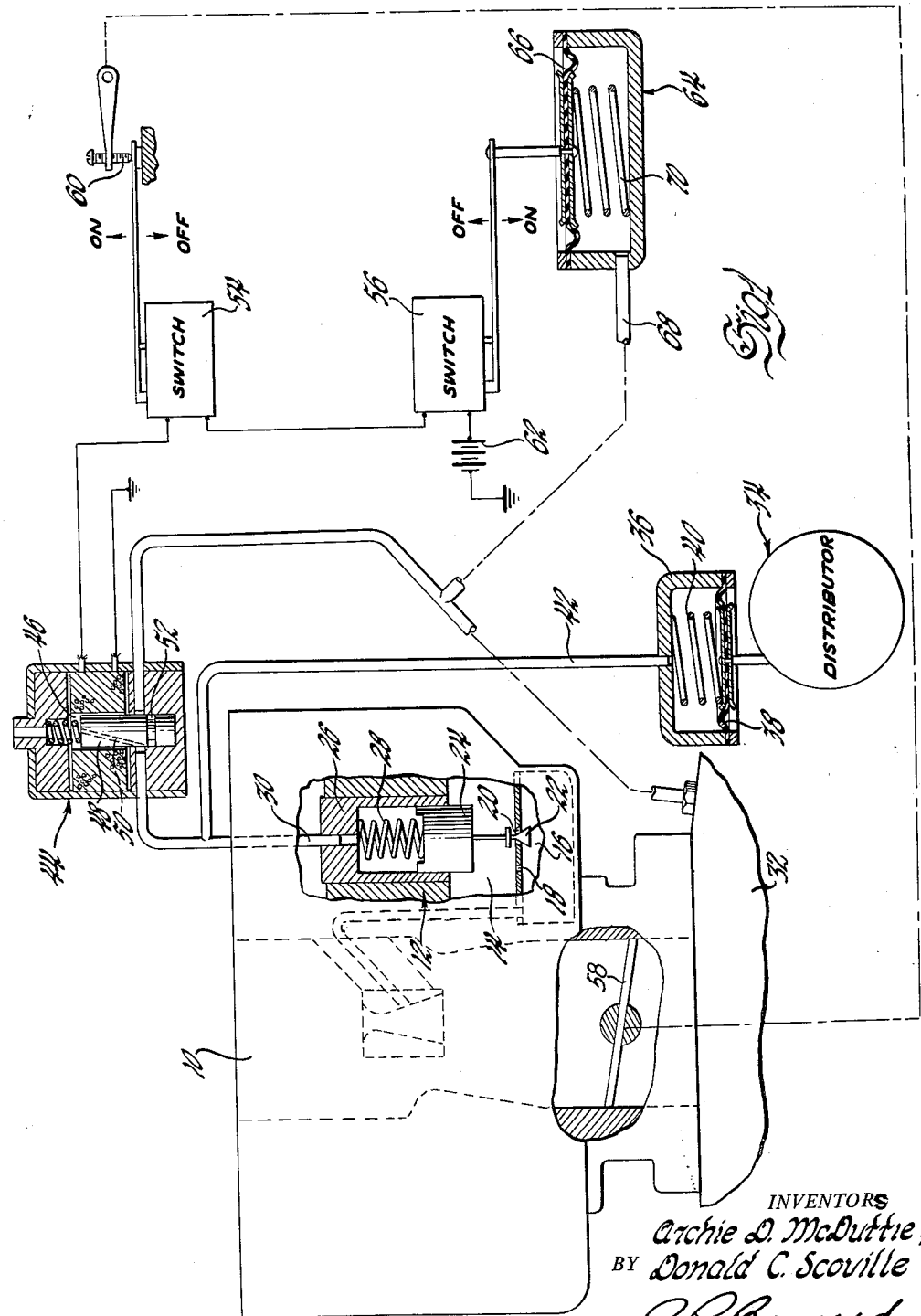

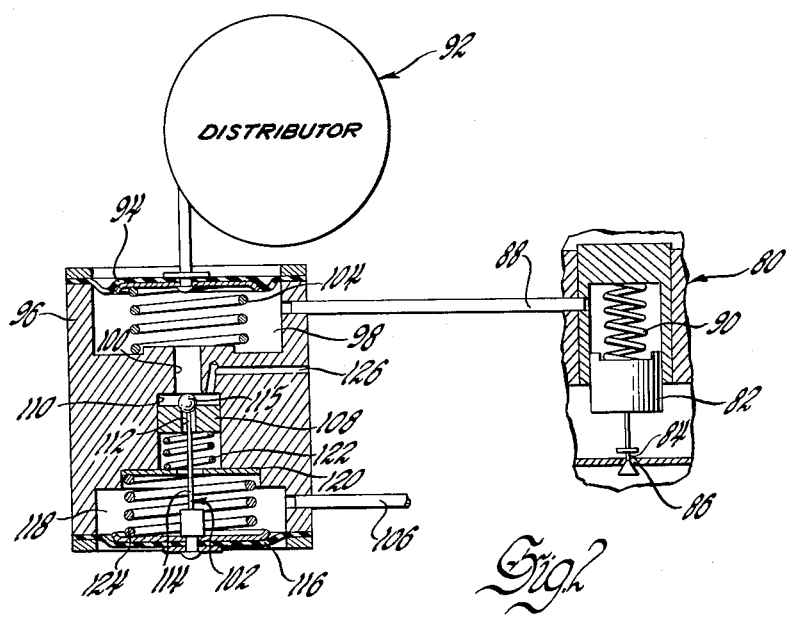
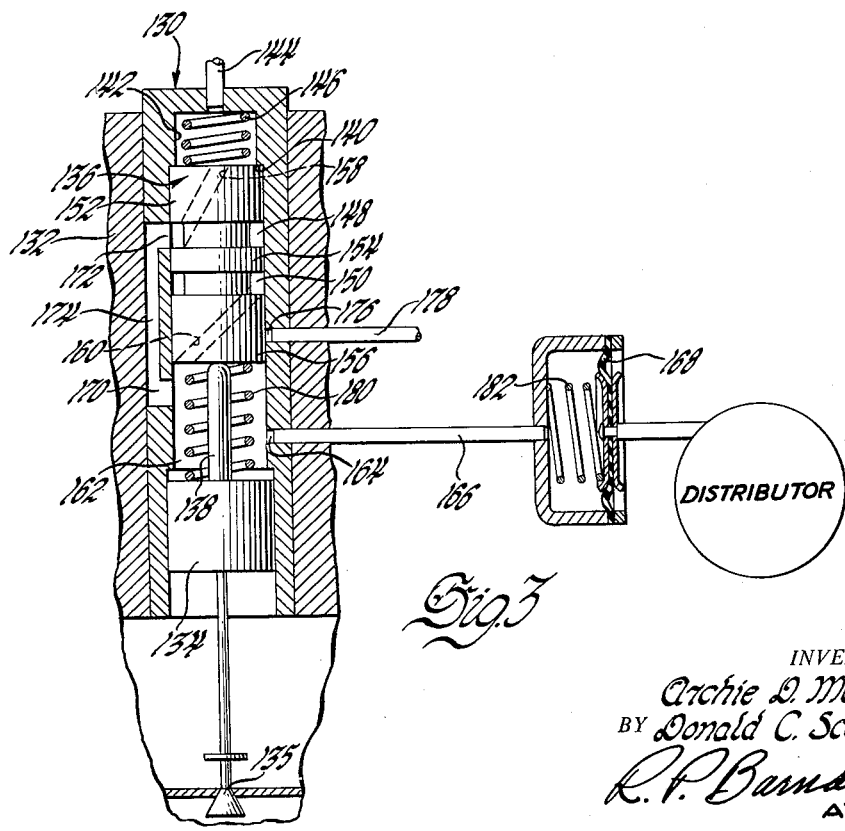

3,014,974
SPARK ADVANCE AND FUEL MIXTURE
CONTROL DEVICE
Archie D. McDuffie, Waterford, and Donald C. Scoville, Fenton, Mich., assignors to General Motors Corporation, Detroit, Mich., a corporation of Delaware
Filed May 22, 1959, Ser. No. 815,200
11 Claims. (Cl. 123—148)

The present device relates to a system for coordinating the actuation and control of the distributor spark advance and the carburetor mixture ratio. In the past it has been the practice to control each of these variables by separate and essentially uncoordinated devices.

With respect to the distributor, it has been common practice to provide a diaphragm connected to the distributor in such a way as to rotate the distributor plate in one direction or the other and thereby advance or retard the ignition spark in accordance with engine manifold vacuum. At the same time, it has been the practice to provide a carburetor with a mixture control or economizer valve which is adapted to vary the quantity of fuel supplied to the carburetor nozzles in accordance with engine load. In other words, under conditions of low engine load or high manifold vacuum the valve is maintained in a closed position usually thereby limiting the fuel supplied to the amount which can flow through a fixed orifice. On the other hand, when the load is great or manifold vacuum is low, the valve is caused to open to supplement the quantity of fuel supplied through the orifice for a limited time.

As suggested, in the past the spark advance and carburetor mixture ratio have not been truly coordinated due to many variable factors operating on each of the control devices including differences in manufacturing tolerances. As a consequence of this lack of coordinate action between spark advance and carburetor mixture control, the triggering or actuating range of each of these devices has been variable over a considerable range contributing to inefficient engine operation.

One of the basic reasons why such coordinated control has not heretofore been achieved was the apparent incompatibility in the operating characteristics of the spark advance and mixture controlling devices. For instance, the spark advance requires a device utilizing a relatively long travel for full range of operation while the carburetor mixture control valve travel is relatively short.

The present invention provides a system whereby distributor spark advance and carburetor mixture control may be coordinated in such a way as to increase the engine operating efficiency. More specifically the present invention includes a common valve member for controlling the actuation of both the distributor spark advance and the carburetor mixture control. Further, the present invention comprehends that the actuation of this common valve may be controlled by engine vacuum and throttle position. It is also within the scope of the present invention that engine vacuum may directly control the common valve and also provide the force for controlling spark advance and the carburetor mixture ratio valve servos.

The details as well as other objects and advantages of the present invention will be apparent from a perusal of the detailed description which follows.

In the drawings:
FIGURE 1 is a diagrammatic representation of one specie of the present invention in which engine vacuum and throttle position control the actuation of distributor spark advance as well as carburetor fuel enrichment;
FIGURES 2 and 3 are diagrammatic representations of two species of the invention in which spark advance and carburetor enrichment are controlled solely by engine vacuum.

Referring to FIGURE 1, a carburetor is shown schematically at 10 and includes a fuel economizer valve or power piston mechanism shown generally at 12. Carburetor 10 may be of any well known type and the details, per se, constitute no part of the present invention. The carburetor will only be described to the extent necessary to understand the present invention and includes a fuel chamber 14 which communicates with a fuel passage 16 through an orifice 18 and an opening 20. Mechanism 12 includes a valve member 22 adapted to coact with opening 20 to control the flow therethrough in accordance with the position of a piston 24 slidably disposed in a cylinder casing 26. A spring member 28 disposed in casing 26 urges piston 24 and hence valve 22 in a downwardly position to permit fuel flow through opening 20. Casing 26 communicates through a line 30 with a source of vacuum indicated generally at 32. When vacuum source 32 is communicated with casing 26 it will cause the piston to be moved to an upper position against the force of spring 28 blocking fuel flow through opening 20 and limiting the fuel supplied to the carburetor fuel nozzles to that amount which can flow through orifice 18. Thus, under normal engine load operating conditions, fuel is supplied to the carburetor solely through orifice 18. Under conditions of high load demand, the piston 24 will cause economizer valve 22 to be opened whereby additional fuel is supplied to the carburetor for a limited period of operation.

A distributor is shown schematically at 34 and includes a servo 36 adapted to control the advance of the engine spark in accordance with the position of a diaphragm 38 suitably articulated to a rotatable element of the distributor in the conventional manner. Servo 36 also includes a spring element 40 adapted to bias the diaphragm in a direction tending to retard the spark. Servo 36 communicates through a passage 42 with vacuum line 30 to retain the distributor in an advanced position when the vacuum lines are communicated with vacuum source 32. Thus both the carburetor economizer valve mechanism 12 and distributor 34 are adapted to be actuated in accordance with the presence or absence of vacuum in line 30. The means for controlling this vacuum will now be considered in greater detail.

A solenoid valve 44 is interposed in line 30 intermediate devices 12 and 34 and vacuum source 32. The solenoid valve may be of any well known type such that when the solenoid is de-energized vacuum is cut off and when energized vacuum admitted to line 30. For illustrative purposes, valve 44 includes a longitudinally extending passage 46 adapted to communicate line 30 to atmosphere. A valve element 48 is slidably disposed in passage 46 and biased to a position blocking vacuum from communicating with devices 12 and 34. A passage 50 is formed in element 48 and vents line 30 to atmosphere posteriorly of valve 44 when the solenoid is deenergized as shown. An annular groove 52 is formed in element 48 and through which vacuum source 32 is communicated with devices 12 and 34 when the solenoid is energized.

When deenergized, solenoid valve 44 will cut off the vacuum and vent line 30 to atmosphere permitting springs 28 and 40 to respectively open the carburetor economizer valve 22 and to retard the distributor spark. On the other hand, energization of the solenoid valve admits vacuum to line 30 closing enrichment valve 22 and advancing the distributor spark.

In the specie of FIGURE 1, the control of solenoid valve 44 is achieved through switches 54 and 56. Switch 54 is actuated in accordance with the position of carburetor throttle 58. Switch 54 is adapted to be held open by throttle stop 60 when the throttle valve is in its idle position. Thus since switch 54 is in series with switch 56 and power source or battery 62, when throttle 58 is in its idle position solenoid valve 44 must be deenergized providing an idle spark setting of the distributor, i.e., retarded, and opening of the carburetor idle economizer valve 22. Since during idle fuel is being supplied to the carburetor induction passage through the idle system, not shown, the opening of the economizer valve has no effect on the quantity of fuel supplied under this condition.

Switch 56 is controlled by a servo 64 which includes a diaphragm 66 exposed to engine vacuum through a conduit 68. A spring 70 normally urges diaphragm 66 in a direction tending to open switch 56. Under normal operating conditions, e.g., engine vacuum in excess of nine inches of mercury, the engine vacuum acting on the diaphragm will move the diaphragm against the force of spring 70 closing switch 56 and conditioning the system for energizing solenoid valve 44 depending on the condition of switch 54. Thus when throttle valve 58 is moved to an off-idle position, switch 54 will be closed and with engine vacuum at its normal level switch 56 will also be closed whereby the electrical power source 62 energizes solenoid valve 44, supra. Should a sudden load be imposed on the engine, engine manifold vacuum will drop in passage 68 causing switch 56 to be opened and deenergizing the solenoid valve. Thus the carburetor economizer valve will be opened increasing the fuel flow and at the same time retarding the distributor spark both occurrences which are consistent with the increased engine load. After the added power demand abates, manifold vacuum will again close switch 56 returning the fuel flow to its normal or economy level and advancing the distributor spark, supra.

In the species of the invention shown in FIGURES 2 and 3, devices are provided in which the control of a carburetor fuel mixture or economizer valve and the engine distributor are controlled solely through variations in engine vacuum. Referring first to FIGURE 2, a carburetor mixture valve is shown at 80 and includes a power piston 82 for controlling a valve element 84 which in turn controls fuel flow through an opening 86 for the same purpose as described with regard to the species of FIGURE 1. A vacuum line 88 communicates power piston 82 with a source of vacuum and is adapted to move the piston upwardly against the force of spring 90 to block fuel flow through opening 86.

A distributor is shown at 92 and is connected to a servo diaphragm 94 to control the advance of distributor spark. Servo diaphragm 94 is mounted within a casing member 96 such that the diaphragm and casing define a chamber 98 which communicates through a central passage 100 with a valve device indicated generally at 102. A spring element 104 is mounted in chamber 98 and normally biases the diaphragm in a direction tending to retard the distributor spark. Valve device 102 is adapted to be supplied with engine manifold vacuum through a conduit 106 and under certain operating conditions this vacuum is adapted to be supplied through the valve device to the servo diaphragm 94 to move the diaphragm against the force of spring 104 to advance the distributor spark. At the same time valve device 102 admits engine vacuum to vacuum line 88 moving power piston 82 to block fuel flow through opening 86.

The construction and operation of valve device 102 will now be considered in detail. Valve device 102 includes a seat member 108 slidably disposed within a recess 110 in casing 96. Member 108 has a central opening 112 therethrough. A valve stem element 114 is secured at one end to a diaphragm member 116 mounted within casing 96. The other end of element 114 includes a ball valve member 115 adapted to coact with opening 112 through slidable seat member 108. Diaphragm 116 and casing 96 define a chamber 118 which communicates with engine vacuum conduit 106. A spring seat 120 is disposed within a recessed portion of casing 96 and supports a first spring element 122 normally biasing the slidable valve seat 108 in an upwardly direction. Seat 120 also supports a second spring element 124 adapted to urge diaphragm 116 in a downwardly direction. Central passage 100 is adapted to be communicated with the atmosphere through a vent passage 126 formed in casing 96.

The operation of valve device 102 will now be considered. As shown in FIGURE 2, the device is in the retarded spark position and economizer valve 84 open due to the existence in chamber 98 of an engine vacuum of less than nine inches of mercury. Under these circumstances, spring 124 urges the diaphragm 116 and hence valve element 114 downwardly blocking central opening 112 in valve seat 108. At the same time valve seat 108 is moved downwardly opening the vent passage 126. Thus with chamber 98 and vacuum line 88 at atmospheric pressure, springs 104 and 90 respectively will cause the distributor spark to be retarded and economizer valve 84 opened.

Throttle movement toward an idle or decreased engine load position will raise engine vacuum in chamber 118 to a value in excess of nine inches of mercury. This will cause diaphragm 116 to compress spring 124 at the same time moving the ball valve portion 115 of valve element 114 upwardly whereby movable seat 108 is moved by its spring 122 upwardly to a position blocking the atmospheric vent passage 126. After seat 108 abuts against casing 96, continued upward movement of the valve element 114 will cause ball portion 115 to uncover passage 112 communicating the engine vacuum in chamber 118 to servo chamber 98 causing diaphragm 94 to be moved downwardly to advance distributor spark and close the fuel economizer valve 84, consistent with reduced engine load.

A modified form of the valve for controlling distributor spark advance and carburetor economizer valve is shown in FIGURE 3 and in general substitutes a slidable spindle type valve for the diaphragm valve of the modification of FIGURE 2. In this modification a valve body housing is provided generally at 130 and is mounted within a casing member 132. A power piston 134 is slidably disposed within housing 130 and is adapted to control the actuation of a carburetor fuel economizer valve 135, the operation of which is the same in the other modifications of the invention. A spindle valve element 136 is also slidably disposed within housing 130 and is adapted to directly engage the power piston through a stem portion 138 formed on the latter. Valve body housing 130 includes a portion of reduced diameter which forms a shoulder 140 against which valve element 136 is adapted to abut. A housing recess portion 142 communicates through a conduit 144 with a source of engine vacuum. A spring element 146 is disposed in housing recess 132 and normally urges valve element 136 in a downwardly direction.

Valve element 136 has annular grooves 148 and 150 formed therein which provide lands 152, 154 and 156. A first diagonal passage 158 is formed through land 152 and terminates at one end in communication with recess 142 and at the other end in annular groove 148. A second diagonal passage 160 is formed in land 156 communicating annular groove 150 with a chamber 162 defined by piston 134, element 136 and housing 130. A port 164 is formed in housing 130 and communicates with a conduit 166 leading to a distributor servo diaphragm 168 of the type shown and described in the modifications of FIGURES 2 and 3. Housing port 164 is continuously in communication with chamber 162. A second port 170 is formed in housing 130 and communicates chamber 162 with a longitudinally spaced port 172 through a passage or groove 174.

A vent port 176 is formed in housing 130 and communicates with the atmosphere through a passage 178.

The operation of the valve device is as follows. Under normal operating conditions, e.g., manifold or engine vacuum in excess of nine inches of mercury, the vacuum in recess 142 will act upon the slidable valve element 136 to raise the same against the force of spring 146 to the position shown in FIGURE 3. In this position annular groove 148 of the valve elements communicates with housing port 172 whereby manifold vacuum will be conveyed to chamber 162 causing the power piston to be raised against the force of a spring 180 to close economizer valve 135. At the same time, the engine vacuum in chamber 162 will act through port 164 and conduit 166 to move the distributor servo diaphragm to a position to advance the distributor spark. This results in a condition of lean fuel flow and advance spark compatible with a lightly loaded engine. Upon the decrease of manifold vacuum below a predetermined value, e.g., nine inches of mercury, spring 146 will shift valve element 136 to a lower position causing lands 152 and 156 to respectively block housing ports 172 and 170 and register annular groove 150 with atmospheric vent port 176. This latter movement of valve element 136 will cause a similar downward movement of power piston 134 opening the economizer valve 135 and at the same time venting chamber 162 to atmosphere whereby the distributor servo diaphragm will be moved by suitable spring means 182 to a spark retard position.

Thus, the valve devices shown in FIGURES 2 and 3 provide varying modifications of valve devices which are actuated by changes in engine vacuum to affect changes in spark advance as well as the fuel richness in the carburetor. In these latter two devices throttle position only indirectly affects the control of the carburetor enrichment valve and the distributor whereas in the modification of FIGURE 1 throttle position directly affects the actuation of these devices.

Referring again to the specie of the invention shown in FIGURE 1, it is to be noted that while pressure source 32 is illustrated as being sub-atmospheric it could also be super-atmospheric if desired. In this event the pressure fluid would simply act on the opposite sides of power piston 24 and diaphragm 38.

The devices of FIGURES 1, 2 and 3 are arranged to obtain quick and positive action of the distributor and mixture valves. This is necessary to avoid the oscillatory hunting and partial action of one or both of the functions when the control vacuum is just at the critical transfer value. This positive action must exist in both directions of change.

In the electrical device, FIGURE 1, this is accomplished by making switches 54 and 56 of the type requiring a greater force to move them than to hold or return them. Therefore, once the force has built up to the point of initiating action, this action cannot reverse until there is a definite change in the operating pressure. Switches having such a hysteresis effect are generally well known and available.

In FIGURE 3, the differential action is accomplished by the use of different diameters for the pistons. Starting from the position shown, the force holding the assembly up against the springs 146 and 180 is the manifold depression acting on the area of the large piston 134 only. A reduction in this depression below the equivalent spring force will let the combination move downward until the vent 178 is cracked open. At this instant there is a pressure drop across piston 136 and spring 146 will cause a rapid and large movement of the assembly to open valve 135 and complete the total valve action. The reverse procedure requires a higher depression to start raising piston 136 with no help from piston 134 until port 172 is cracked open after which there will be an increase in upward force to complete the valve action.

The same effect is accomplished in FIG. 2, by the change in pressure area on valve 108 when seated and when open. In any case, this effect must be obtained to avoid a fluttery operation of the engine since there will be a definite although small increase in manifold depression when the enricher valve opens giving more power and consequently more speed without considering a change in throttle opening. The differential forces built into the mechanism must be larger than this anticipated change in manifold depression.

Other modifications of the subject invention may be made within the scope of the hereinafter appended claims.

We claim:

1. An internal combustion engine comprising in combination an electrical spark distributor, means associated with the distributor for controlling the spark advance, a carburetor including a valve for varying fuel flow under varying engine load conditions, and a common valve means for controlling the distributor spark controlling means and the carburetor fuel valve, said common valve means being adapted to simultaneously actuate the distributor spark controlling means to advance the spark and the carburetor fuel valve to reduce fuel flow under conditions of high engine vacuum.

2. An internal combustion engine comprising in combination an electrical spark distributor, said distributor including a first servo device for varying the spark advance, a carburetor including a valve for varying fuel flow, said valve including a second servo device for actuating said valve, a source of vacuum, and a common valve means for controlling the first and second servo devices.

3. An internal combustion engine comprising in combination an electrical spark distributor, means associated with the distributor for controlling the spark advance, a carburetor including a valve for varying fuel flow under varying engine load conditions, and a common valve means for controlling the distributor spark controlling means and the carburetor fuel valve, said common valve means being operable by engine vacuum to simultaneously actuate the distributor spark controlling means and the carburetor fuel valve, and spring means adapted to bias the common valve means to a position causing the spark to be retarded and fuel flow increased when engine vacuum is below a predetermined value.

4. An internal combustion engine comprising in combination an electrical spark distributor, said distributor including a first servo device for varying the spark advance, a carburetor including a valve for varying fuel flow, said valve including a second servo device for actuating said valve, a source of pressure, a common valve means being operable by engine vacuum to simultaneously communicate the pressure source with said first and second servo devices, and spring means adapted to bias the common valve means to a position cutting off said pressure source whereby the first and second servo devices will respectively cause the spark to be retarded and the fuel flow increased when engine vacuum is below a predetermined value.

5. An internal combustion engine comprising in combination an electrical spark distributor, said distributor including a first servo device for varying the spark advance, a carburetor including a throttle, a valve for varying fuel flow, said valve including a second servo device for actuating said valve, a source of pressure, a solenoid controlled valve means adapted to simultaneously communicate the pressure source with said first and second servo devices, an electric power source, first and second series connected switch means adapted to connect the power source with the solenoid controlled valve means, said throttle being adapted to control the first switch means, and an engine vacuum responsive servo for controlling the second switch means, energization of the solenoid controlled valve means by the first and second switch means causing the pressure source to actuate the first and second servo devices to modify spark advance and carburetor fuel flow.

6. An internal combustion engine comprising in combination an electrical spark distributor, said distributor including a first servo device for varying the spark advance, a carburetor including a throttle, a valve for varying fuel flow, said valve including a second servo device for actuating said valve, a source of pressure, a solenoid controlled valve means adapted to simultaneously communicate the pressure source with said first and second servo devices, an electric power source, switch means operable by certain engine operating parameters, energization of the solenoid controlled valve means by the first and second switch means causing the pressure source to actuate the first and second servo devices to modify spark advance and carburetor fuel flow.

7. An internal combustion engine as set forth in claim 5 in which the first switch means is opened when the throttle is in idle position to retard the spark advance of the distributor.

8. An internal combustion engine as set forth in claim 5 in which the energization of the solenoid controlled valve means causes the pressure source to actuate the first and second servo devices to advance the distributor spark and reduce carburetor fuel flow.

9. An internal combustion engine comprising in combination an electrical spark distributor, means associated with the distributor for controlling the spark advance, a carburetor including a servo controlled valve for varying fuel flow under varying engine load conditions, and a common valve means for controlling the distributor spark controlling means and the carburetor fuel valve, said common valve means comprising a casing, a pair of axially spaced cavities formed in the casing, a longitudinal passage adapted to connect said cavities, a pair of flexible diaphragms mounted on said casing and respectively enclosing each cavity, one of said diaphragms being connected to the distributor to control spark advance, spring means biasing said one diaphragm to retard the spark, a first conduit communicating the cavity associated with the distributor controlling diaphragm with the servo controlled carburetor valve, a second conduit adapted to communicate the latter cavity to atmosphere, a third conduit communicating the cavity associated with the other diaphragm with a source of engine manifold vacuum, and a valve device operable by said other diaphragm and disposed within said longitudinal passage to control communication between the cavities and thereby control actuation of said distributor and carburetor fuel valve.

10. An internal combustion engine as set forth in claim 9 in which said valve device includes a recess formed in the longitudinal casing passage, a seat element having a central opening therethrough slidably disposed within said recess, a first spring member biasing said seat element to block said atmospheric vent conduit, a valve element fixed at one end to said other diaphragm, the other end of the valve element extending through the opening in said seat element and terminating in an enlarged portion, a second spring member adapted to bias the other diaphragm to a position causing the enlarged portion of the valve element to seat against the seat element to block the opening therethrough and also to move the seat element to uncover the atmospheric conduit.

11. An internal combustion engine comprising in combination an electrical spark distributor, means associated with the distributor for controlling the spark advance, a carburetor including a servo controlled valve for varying fuel flow under varying engine load conditions, and a common valve means for controlling the distributor spark controlling means and the carburetor fuel valve, a servo for controlling the distributor spark advance, said common valve means including a cylindrical casing communicating at one end with a source of engine manifold vacuum, a valve element slidably mounted in said casing proximate said one end, the servo controlled carburetor valve including a piston member slidably disposed in said casing, the piston member having a stem abuttingly engaging the valve element, a first port in the casing disposed intermediate the valve element and piston member, a conduit connecting the first port with the distributor servo, a second casing port registering with the space between the valve element and piston member, a third casing port longitudinally spaced from the second port, a casing passage connecting the second and third ports, a fourth casing port opening to atmosphere, first and second passages in said valve element, manifold vacuum above a predetermined value being adapted to move the valve element to a position in which the first valve element passage communicates the third casing port with the manifold vacuum source and blocks the fourth casing port whereby the piston member causes reduced fuel flow and the distributor servo advances the spark, and spring means for shifting the valve element when said vacuum is below a predetermined value to block vacuum and vent the piston member and distributor servo to atmosphere thereby increasing fuel flow and retarding the spark.

References Cited in the file of this patent
UNITED STATES PATENTS
2,493,582   Hunt _____ Jan. 3, 1950